(12) United States Patent
Tanaka et al.

(10) Patent No.: US 7,702,742 B2
(45) Date of Patent: Apr. 20, 2010

(54) MECHANISM FOR ENABLING MEMORY TRANSACTIONS TO BE CONDUCTED ACROSS A LOSSY NETWORK

(75) Inventors: Bert H. Tanaka, Saratoga, CA (US); Daniel J. Maltbie, Santa Cruz, CA (US); Joseph R. Mihelich, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 988 days.

(21) Appl. No.: 11/333,877

(22) Filed: Jan. 17, 2006

(65) Prior Publication Data

US 2009/0319634 A1 Dec. 24, 2009

Related U.S. Application Data

(60) Provisional application No. 60/645,000, filed on Jan. 18, 2005.

(51) Int. Cl.
  H04L 12/26 (2006.01)
  H04L 12/56 (2006.01)
  G06F 15/167 (2006.01)
  G06F 15/16 (2006.01)
  G06F 13/28 (2006.01)

(52) U.S. Cl. ............... 709/212; 370/231; 370/412; 370/428; 709/232; 709/236; 710/24

(58) Field of Classification Search ............ 370/412, 370/428, 474; 709/212, 232, 236
  See application file for complete search history.

(56) References Cited

U.S. PATENT DOCUMENTS 5,613,071 A * 3/1997 Rankin et al. ............ 707/10
5,936,958 A * 8/1999 Soumiya et al. ........ 370/395.43
6,205,498 B1 * 3/2001 Habusha et al. ............ 710/29
6,230,219 B1 * 5/2001 Fields et al. ............... 710/22
6,466,580 B1 * 10/2002 Leung ...................... 370/412
6,678,246 B1 * 1/2004 Smyth ...................... 370/230
6,799,220 B1 * 9/2004 Merritt et al. ............. 709/238
6,970,978 B1 * 11/2005 Wu .......................... 711/137
7,062,609 B1 * 6/2006 Trehus et al. ............. 711/141

(Continued)

OTHER PUBLICATIONS

M. Allman, "RFC 2581: TCP Congestion Control," Apr. 1999, Network Working Group, p. 8-10.*

(Continued)

Primary Examiner—Dang T Ton
Assistant Examiner—Ryan C. Kavleski
(74) Attorney, Agent, or Firm—Hamilton, DeSanctis & Cha, LLP

(57) ABSTRACT

A network interface is disclosed for enabling remote programmed I/O to be carried out in a "lossy" network (one in which packets may be dropped). The network interface: (1) receives a plurality of memory transaction messages (MTM's); (2) determines that they are destined for a particular remote node; (3) determines a transaction type for each MTM; (4) composes, for each MTM, a network packet to encapsulate at least a portion of that MTM; (5) assigns a priority to each network packet based upon the transaction type of the MTM that it is encapsulating; (6) sends the network packets into a lossy network destined for the remote node; and (7) ensures that at least a subset of the network packets are received by the remote node in a proper sequence. By doing this, the network interface makes it possible to carry out remote programmed I/O, even across a lossy network.

26 Claims, 9 Drawing Sheets

U.S. PATENT DOCUMENTS

| | | | |
|---|---|---|---|
| 7,185,128 B1* | 2/2007 | Kotlowski et al. | 710/104 |
| 2002/0133531 A1* | 9/2002 | Fukushima | 709/103 |
| 2002/0152315 A1* | 10/2002 | Kagan et al. | 709/228 |
| 2002/0174294 A1* | 11/2002 | Tamura | 711/113 |
| 2003/0014624 A1* | 1/2003 | Maturana et al. | 713/151 |
| 2003/0140167 A1* | 7/2003 | Harvey et al. | 709/238 |
| 2004/0010612 A1* | 1/2004 | Pandya | 709/230 |
| 2004/0037319 A1* | 2/2004 | Pandya | 370/469 |

OTHER PUBLICATIONS

M. Mathis, "RFC 2018: TCP Selective Acknowledgement Options," Oct. 1996, Network Working Group, p. 2-8.*

Information Sciences Institute, "RFC: 793 Transmission Control Protocol," Sep. 1981.*

Patrick Geoffray, Ph.D., HPCwire: A Critique of RDMA, http://www.printthis.clickability.com/pt/cpt?action=cpt &title=HPCwire%3A+A+Critique+..., 6 pages. Aug. 18, 2006.

John A. Stankovic, Distributed Computing, Department of Computer Science, University of Massachusetts, 35 pages.

Mallikarjun Chadalapaka et al., Datamover Architecture for iSCSI (DA) (Version 1.0), 58 pages, Jul. 21, 2003.

Mike Ko et al., iSCSI Extensions for RDMA Specification (Version 1.0), 76 pages, Jul. 2003.

James Pinkerton et al., Sockets Direct Protocol (SDP) for iWARP over TCP (v1.0), 106 pages, Oct. 31, 2003.

Mike Ko, Technical Overview of iSCSI Extensions for RDMA (iSER) & Datamover Architecture for iSCSI (DA) (Version 1.0), RDMA Consortium, 35 pages, Jul. 21, 2003.

Andrew Geweke et al., An Evaluation of the DEC Memory Channel—Case Studies in Reflective Memory and Cooperative Scheduling, University of California, Berkeley, 11 pages, May 21, 1999.

Gilad Shainer, MSc., HPCwire: Why Compromise?, http://www.printthis.clickability.com/pt/cpt?action=cpt &title=HPCwire%3A+Why+Compr..., 7 pages, Oct. 6, 2006.

Renato Recio, HPCwire: A Tutorial of the RDMA Model- A Response to 'A Critique of RDMA' and a Critique on Legacy Network Adapter Architectures, http://www.printthis.clickability.com/pt/cpt?action=cpt&title=HPCwire%3A+A+Tutorial+..., 8 pages, Sep. 15, 2006.

Jim Pinkerton, Sockets Direct Protocol v1.0, RDMA Consortium, 32 pages, Oct. 14, 2003.

Leonidas I. Kontothanassis et al., Efficient Shared Memory with Minimal Hardware Support, Department of Computer Science, University of Rochester. 7 pages, Jul. 1995.

Pete Keleher et al., TreadMarks: Distributed Shared Memory on Standard Workstations and Operating Systems., Department of Computer Science, Rice University. 17 pages.

Stein Jorgen Ryan et al., SCI for Local Area Networks, Department of Informatics. 23 pages, Jan. 1998.

Simon Nieuviarts, OpenMP Implementation for an SCI-based Cluster of Workstations. Bull/INRIA, Laboratoire SIRAC, INRIA Rhone-Alpes, France. 8 pages. Jul. 17, 2001.

Stein J. Ryan, Arne Maus et al., The Design of an Efficient Portable Driver for Shared Memory Cluster Adapters, University of Oslo. 6 pages.

Leonidas Kontothanassisy et al., VM-Based Shared Memory on Low-Latency, Remote-Memory-Access Networks, Department of Computer Science -University of Rochester & DEC Cambridge Research Lab. 13 pages.

Jim Pinkerton, The Case for RDMA, RDMA Consortium, 27 pages, May 29, 2002.

* cited by examiner

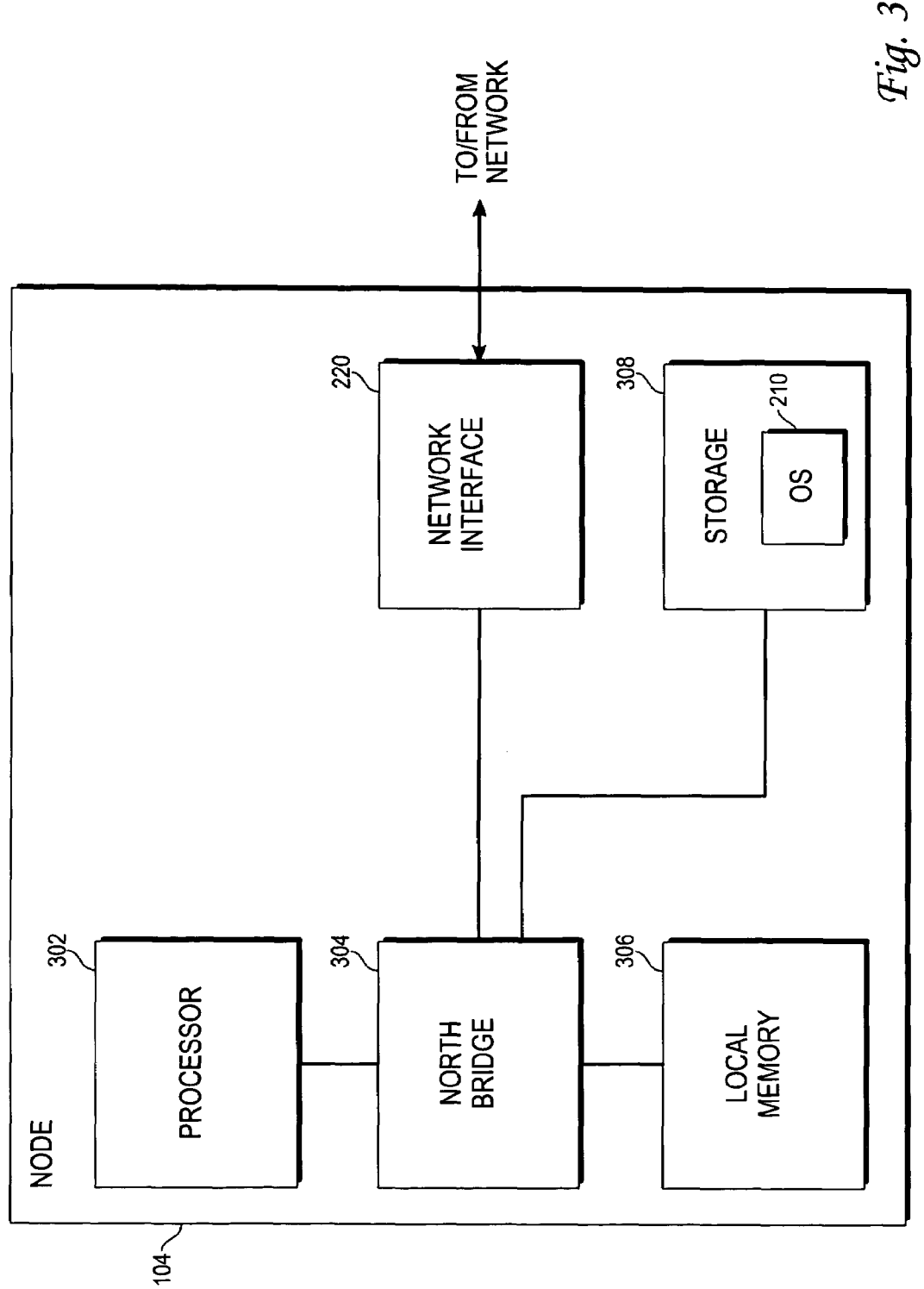

| ROW PASS COLUMN? | | POSTED REQUEST | | NONPOSTED REQUEST | | RESPONSE (READ OR NONPOSTED WRITE) | |
|---|---|---|---|---|---|---|---|
| TRANSACTION TYPE | BYPASS FLAG | BYPASS FLAG=0 | BYPASS FLAG=1 | READ | WRITE | BYPASS FLAG=0 | BYPASS FLAG=1 |
| POSTED REQUEST | 0 | NO | NO | YES | YES | YES | YES |
| | 1 | YES/NO | NO | YES | YES | YES | YES |
| NON-POSTED REQUEST | 0 | NO | NO | YES/NO | YES/NO | YES/NO | YES/NO |
| | 1 | YES/NO | YES/NO | YES/NO | YES/NO | YES/NO | YES/NO |
| RESPONSE | 0 | NO | NO | YES | YES | NO | NO |
| | 1 | YES/NO | YES/NO | YES | YES | YES/NO | NO |

Fig. 4

MECHANISM FOR ENABLING MEMORY TRANSACTIONS TO BE CONDUCTED ACROSS A LOSSY NETWORK

PRIORITY INFORMATION

This application claims the benefit of U.S. Provisional Application Ser. No. 60/645,000, entitled A METHOD AND APPARATUS FOR EXTENDING AND TRANSPORTING PROCESSOR BUS PROTOCOLS OVER AN ETHERNET NETWORK, filed on Jan. 18, 2005, the contents of which are incorporated herein in their entirety by this reference.

BACKGROUND

To satisfy the ever-growing need for computing power, the computing industry has moved towards the use of distributed computing systems. In a distributed computing system, a plurality of computing nodes are coupled together via a network to form an overall more powerful system. One of the advantages of a distributed computing system is that it is highly scalable. To increase the computing power of the system, one or more computing nodes may simply be added. Another advantage of a distributed system is that it enables less expensive, commodity computing nodes to be used. This makes it possible to add computing power to a system with relatively minimal cost. Because of these and other advantages, the popularity of distributed computing systems has grown in recent years.

In a distributed computing system, one of the major considerations is the ability of the various computing nodes to communicate with each other. The more easily and efficiently the computing nodes can communicate and interact, the more the overall system appears to be a single integrated system. One of the aspects of this node-to-node interaction is the ability of one node to access the memory controlled by another node.

Currently, a local node can access the memory controlled by a remote node in several ways. One way is through the use of programmed I/O (input/output). With programmed I/O, a portion of the memory controlled by the remote node is mapped into the physical address space of the local node. Once mapped in this way, a processor of the local node may access the remote memory portion as if it were a part of the local node's local memory. The processor may do this, for example, by issuing memory transaction messages (MTMs). These MTMs may have the same format and conform to the same processor bus protocol as the MTMs that the processor would otherwise issue to access the local node's local memory. An underlying component (for example, a network interface) would encapsulate these MTMs within network packets, and send those packets across the network to the remote node. In turn, the remote node would process the packets and perform the requested accesses on the memory that it controls. In this way, the processor on the local node is able to access the memory controlled by the remote node.

With programmed I/O, the processor of the local node expects the same operation and result from a remote memory access as it does from a local memory access. Thus, when performing a remote memory access, the network needs to ensure that its behavior satisfies the expectations of the processor. If it does not, serious errors may result. With programmed I/O, the processor has two main expectations. First, the processor expects the MTMs that it issues will be processed in an order that is consistent with the processor bus protocol. This ordering is important in ensuring proper processing of information, deadlock avoidance, etc. Second, the processor expects that its MTMs will be processed. The MTMs cannot be dropped or ignored. In order to accommodate remote memory access, a network needs to guarantee that these two expectations are met.

Unfortunately, most standard commodity networks, such as Ethernet, do not satisfy these conditions. In an Ethernet network, for example, the switches within the network, under certain circumstances, may drop packets. In the context of programmed I/O, such dropped packets may, and most likely will, lead to serious errors. Also, because packets may be dropped in an Ethernet network, there is no guarantee that packets will be received and processed in any particular order (even if dropped packets are resent). As a result, it has thus far not been possible to use standard commodity networks to implement remote programmed I/O. Rather, proprietary networks such as SCI and DEC memory channel have been used. These proprietary networks are undesirable, however, because they tend to be expensive. Also, because they are non-standard, they tend to be incompatible with most standard equipment, which leads to more increased cost. Because of these and other shortcomings of proprietary networks, it has been difficult up to this point to implement remote programmed I/O in a cost effective and efficient manner.

SUMMARY

In accordance with one embodiment of the present invention, there is provided a mechanism for enabling remote programmed I/O to be carried out across a "lossy" network, such as an Ethernet network. As used herein, the term lossy refers broadly to any type of network in which one or more packets may be dropped. Despite the fact that the network is lossy, the mechanism ensures that a remote node receives every MTM, and that the MTMs are received in proper order.

In one embodiment, the mechanism takes the form of a network interface, which operates as follows. The network interface receives a plurality of MTMs from a local memory controller which controls a local memory. The MTMs may be originated by one or more local processors in accordance with a processor bus protocol, or by the memory controller. The network interface determines that all of these MTMs are destined for a particular remote node. In one embodiment, this determination may be made by mapping a physical memory address in each MTM to the network address of the remote node. In addition to determining the destination for each MTM, the network interface also determines a transaction type for each MTM.

After receiving the MTMs, the network interface composes, for each MTM, a network packet to encapsulate at least a portion of the information in that MTM. This gives rise to a plurality of network packets. Each network packet is assigned one of a plurality of sending priorities. The sending priority assigned to a network packet is determined based upon the transaction type of the MTM that that network packet is encapsulating. After assigning the sending priority, the network interface organizes the network packets into groups based upon the sending priority. The network interface then sends the network packets into a lossy network destined for the particular remote node. In one embodiment, the network packets are sent in an order determined based, at least partially, upon the sending priorities of the network packets. Sending the network packets in that order helps to enforce the ordering of the MTMs expected by the one or more local processors.

Thereafter, the network interface ensures that at least a particular subset of the network packets having a particular sending priority are received by the particular remote node in a proper sequence. In one embodiment, the network interface does so by maintaining a linked-list of sent packets organized by sending priority (where all of the packets in a particular linked-list have the same sending priority). In one embodiment, as each network packet is received, the remote node sends an acknowledgement indicating receipt of that network packet. If the network packets are received by the remote node in the same order as they were sent, then the acknowledgements should also come back to the network interface in that order. Under certain circumstances (for example, a network packet was dropped or corrupted, or an acknowledgement was dropped or corrupted), the network interface may not receive an acknowledgement of a network packet within a certain period of time. When that occurs, the network interface resends that network packet and all network packets following that network packet in the linked-list of which the packet is a part. The network packets are resent in the same order as before. The network interface then waits for acknowledgement of the resent packets. By monitoring for receipt acknowledgements, and by resending network packets, when necessary, in this manner, the network interface ensures that the network packets are received by the remote node, and that they are received in the right sequence. As a result, it is possible to carry out remote programmed I/O, even across a lossy network.

BRIEF DESCRIPTION OF THE DRAWINGS

FIG. 3 shows another possible embodiment of a computing node.

FIG. 4 shows a table in which a set of processor bus protocol ordering rules are specified.

DETAILED DESCRIPTION OF EMBODIMENT(S)

Figure 1:
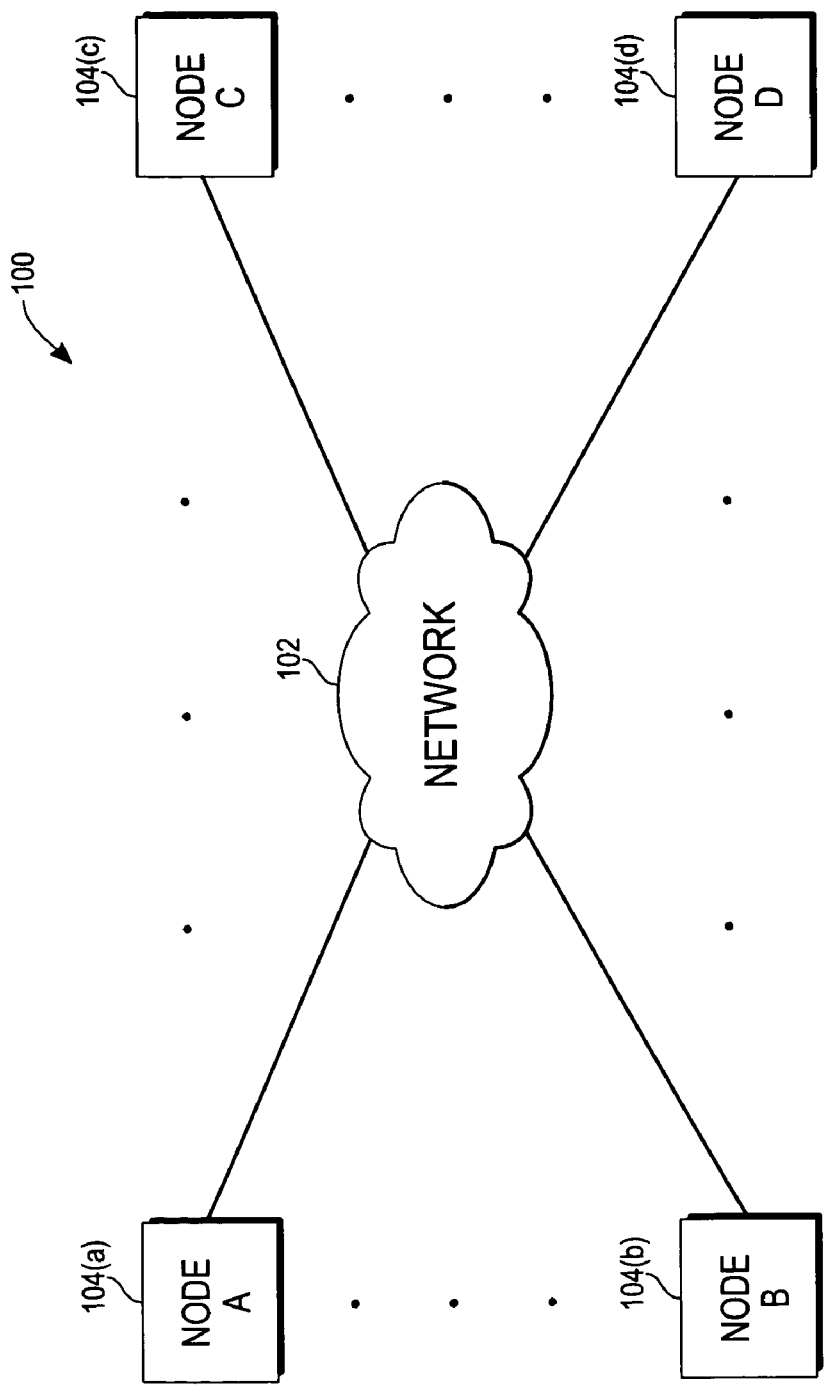
FIG. 1 is a functional block diagram of a distributed computing system in which one embodiment of the present invention may be implemented.

With reference to FIG. 1, there is shown a functional block diagram of a distributed computing system 100 in which one embodiment of the present invention may be implemented. As shown, the system 100 comprises a plurality of computing nodes 104 coupled together by a network 102. The network 102 enables the nodes 104 to communicate, interact, and exchange information so that the various nodes 104 can cooperate to act as a single integrated computing system. For purposes of the present invention, the network 102 may be any type of network, including, but certainly not limited to, a "lossy" network, such as an Ethernet network. As used herein, the term lossy refers broadly to any type of network in which one or more network packets may be dropped by the network (e.g. due to congestion, packet corruption, etc.). Because network packets may be dropped, a lossy network does not guarantee that packets sent in a particular order from a source will arrive at a destination in that order. In fact, some of the packets may not arrive at the destination at all.

Figure 2:
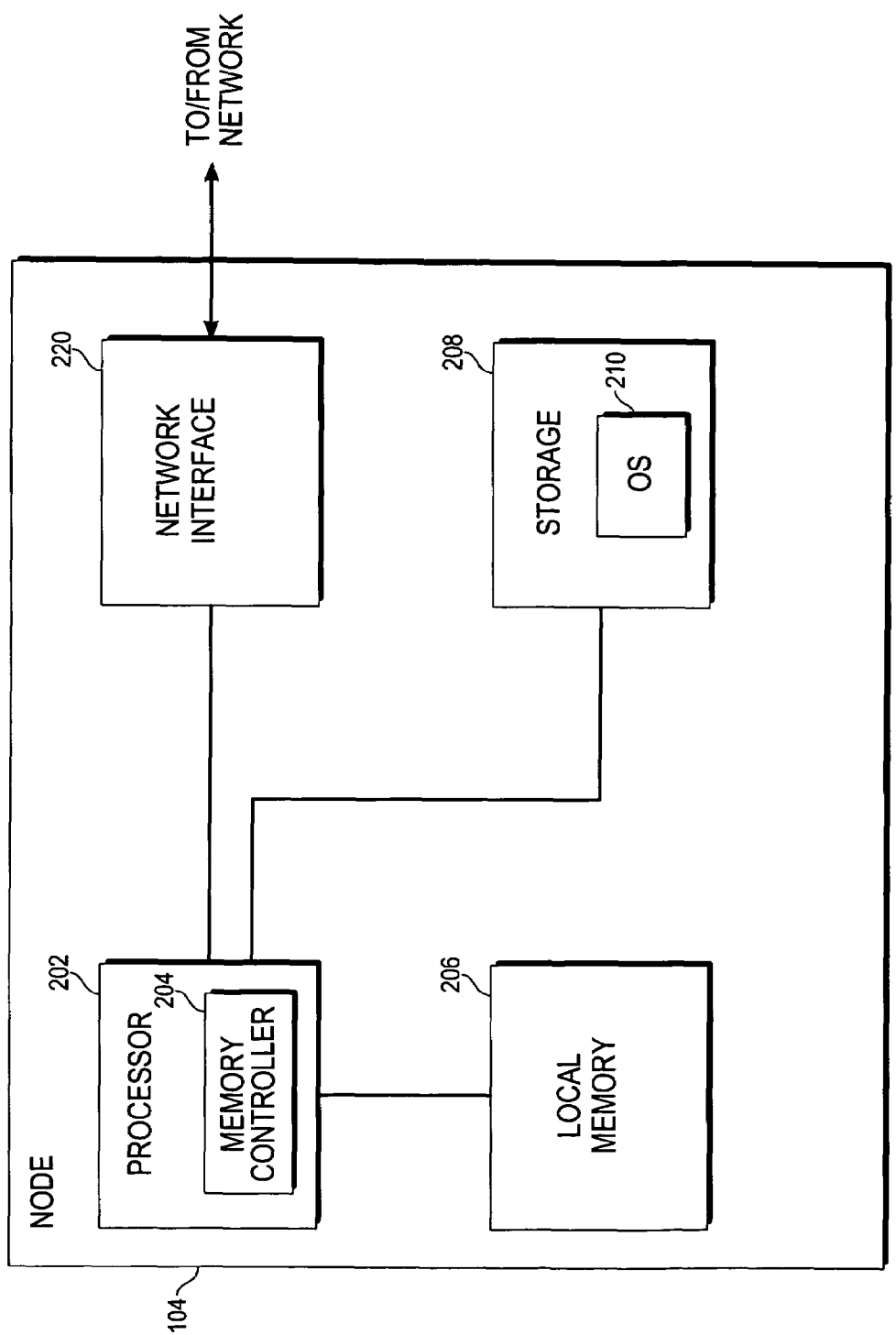
FIG. 2 shows one possible embodiment of a computing node.

FIG. 2 shows one possible embodiment of a computing node 104. As shown, the node 104 comprises a processor 202 having an integrated memory controller 204, a local memory 206, a persistent storage 208 (e.g. a hard drive) for storing an operating system (OS) 210 and other programs (not shown), and a network interface 220. In this architecture, the local memory 206 and the network interface 220 are coupled to the processor 202. The processor 202 accesses the local memory 206 through the integrated memory controller 204.

FIG. 3 shows another possible embodiment of a computing node 104. As shown, the node 104 comprises a processor 302, a north bridge 304, a local memory 306, a persistent storage 308 for storing an OS 210 and other programs (not shown), and a network interface 220. In this architecture, the processor 302, local memory 306, and network interface 220 are all coupled to the north bridge 304. To access the local memory 306, the processor 302 goes through the north bridge 304. In this architecture, the north bridge 304 performs the function of a memory controller (as well as other functions).

FIGS. 2 and 3 show just two possible computing node architectures. For purposes of the present invention, any computing node architecture may be used. In fact, a combination of different node architectures may be used within the overall system 100. For example, node 104(a) may have the architecture shown in FIG. 2, node 104(b) may have the architecture shown in FIG. 3, and node 104(c) may have yet a different architecture. This is within the scope of the present invention. For the sake of simplicity, however, it will be assumed in the following sections that the nodes 104 take on the architecture shown in FIG. 3. It should be noted, though, that the teachings provided herein may be applied generally to any desired node architecture.

Accessing Local Memory

With reference to FIG. 3, a method for accessing a local memory will now be described. When a computing node 104 boots up, its processor 302 loads and executes the OS 210 stored in the persistent storage 308. Upon execution, the OS 210 learns the particulars of the local memory 306. These particulars include the size of the local memory 306. Once it knows the size of the local memory 306, the OS 210 knows how much local physical memory space it has to work with. With this knowledge, the OS 210 defines a range of valid physical memory addresses. Once this range is defined, it is provided to the north bridge 304 for future use (basically, the north bridge 304 now knows the range of valid local physical memory addresses).

During regular operation, the OS 210 supports the execution of one or more programs. Execution of these programs gives rise to virtual address spaces. As portions of these virtual addresses are accessed by the programs, the OS 210 maps the virtual addresses to physical memory addresses. When the mapped virtual addresses are accessed, the corresponding physical memory addresses are accessed.

To access a physical memory address in local memory 306, the OS 210 causes the processor 302 to issue a memory transaction message (MTM) to the north bridge 304. The MTM may, for example, be a request to write a set of data into a physical memory address, or a request to read a set of data from a physical memory address. In one embodiment, an MTM includes a memory access command (e.g. write, read, etc.), a physical memory address, and a set of data (in the case of a write; no data in case of a read). In response to an MTM, the north bridge 304 determines (using the physical address range previously provided by the OS 210) whether the physical memory address specified in the MTM is a valid local memory address. If it is, then the north bridge 304 interacts with the local memory 306 to carry out the requested access. If the requested access was a write, the north bridge 304 causes the data in the MTM to be written into the specified physical memory address. If the requested access was a read, then the north bridge 304 causes data to be read from the specified physical memory address. The north bridge then returns the read data to the processor 302. In this manner, the processor 302, north bridge 304, and local memory 306 cooperate to carry out a local memory access.

Processor Bus Protocol

In carrying out local memory accesses, the processor 302 and north bridge 304 implement a processor bus protocol. This protocol dictates the manner in which the MTMs are to be exchanged. It also governs the format of the messages to be used between the processor 302 and north bridge 304. In addition, the protocol dictates the order in which different types of requests are to be processed. In one embodiment, the ordering of the different types of requests is enforced by the north bridge 304.

In accordance with a processor bus protocol, there are basically three types of MTMs (i.e. three transaction types): (1) a posted request; (2) a non-posted request; and (3) a response. A posted request is a memory access request sent from the processor 302 to the north bridge 304 for which the processor 302 expects no response. A posted write is an example of a posted requested. With a posted write, the processor 302 is simply asking the north bridge 304 to write a set of data into a physical memory address. The processor 302 is expecting no response from the north bridge 304. In contrast, a non-posted request is a memory access request sent from the processor 302 to the north bridge 304 for which the processor 302 is expecting a response. A read request is an example of a non-posted request. With a read request, the processor 302 is expecting the north bridge to respond with a set of read data. Finally, a response is a message sent from the north bridge 304 to the processor 302 in response to a previous request. A read response is an example of a response. The north bridge is responding to a previous read request with the data that the processor 302 requested.

In the processor bus protocol, the three types of transaction messages discussed above are not treated equally. Rather, the north bridge 304 may allow some messages to pass other messages, even though they arrive at the north bridge 304 at a later time (by "passing", it is meant that the requested memory access in a later received MTM is allowed to take place before the requested memory access in an earlier received MTM). FIG. 4 shows a table summarizing the processor bus protocol ordering rules. In the table of FIG. 4, the columns represent a first issued MTM and the rows represent a subsequently issued MTM. The rows and columns are separated into transaction types, and the cells at the intersection of the rows and columns indicate the ordering relationship between the two transactions. The table also shows a bypass flag. This is an additional parameter associated with an MTM that the north bridge 304 can use to determine whether to allow one MTM to pass another. If an MTM has its bypass flag set, then that MTM may have permission to bypass other MTM's that do not have their bypass flag set under certain circumstances. The table entries are defined as follows:

Yes—The second MTM (the row) must be allowed to pass the first MTM (the column). When blocking occurs, the second MTM is required to pass the first MTM;

Yes/No—There are no requirements. The second MTM may pass the first MTM, or be blocked by it.

No—the second MTM must not be allowed to pass the first MTM.

From a perusal of the table, it becomes clear that a posted request transaction type has the highest priority of all of the transaction types. As shown in the table of FIG. 4, if the second MTM (row) is of the posted request transaction type, and the first MTM (column) is of the non-posted request transaction type, then the second MTM can pass the first MTM, as indicated by the four "Yes's" in the cells at the intersection of these rows and columns. Likewise, if the second MTM is of the posted request transaction type, and the first MTM is of the response transaction type, then the second MTM can also pass the first MTM. Thus, a posted request can pass both a non-posted request and a response. Further perusal of the table also reveals that a response transaction type has a higher priority than a non-posted request transaction type. This is shown by the fact that, if the second MTM is of the response transaction type, and the first MTM is of the non-posted request transaction type, then the second MTM can pass the first MTM. Hence, from this observation, it is clear that a posted request transaction type has the highest priority, a response transaction type has the next highest priority, and a non-posted request transaction type has the lowest priority. The significance of this observation will be made clear in a later section.

Enforcement of these ordering rules is important for a number of reasons. These reasons include: maintaining data coherency (by ensuring that transactions are performed in a deterministic order); avoiding deadlock; supporting legacy busses; and maximizing performance. For proper operation, a processor expects these MTM ordering rules to be enforced. If they are not, serious errors can occur.

Accessing Remote Memory

Figure 5:
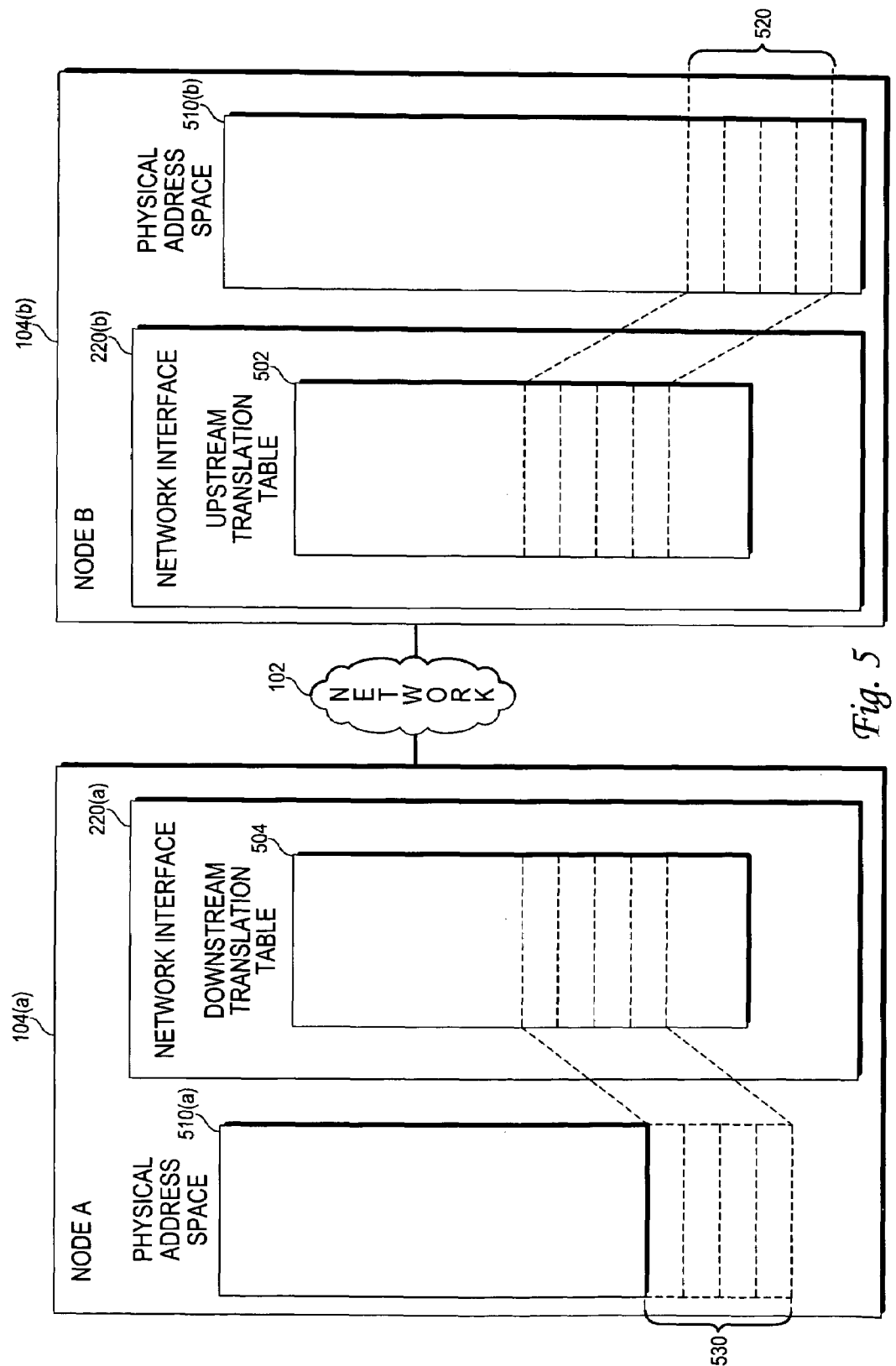
FIG. 5 is a functional block diagram of two computing nodes illustrating how remote memory access may be carried out.

The above discussion describes the manner in which local memory access is carried out. With reference to FIG. 5, the manner in which remote memory access may be performed will now be described. FIG. 5 shows two nodes: node A 104(*a*) and node B 104(*b*). For purposes of the following discussion, it will be assumed that node B is the remote node that is making a portion of its local memory available to other nodes, and that node A is the local node that is remotely accessing the local memory of node B.

In one embodiment, to make a portion 520 of its physical address space 310(*b*) (and hence, a portion of its local memory) available to other nodes, the OS on node B instructs the network interface 220(*b*) of node B to advertise the availability of portion 520 to other nodes. As part of this instruction, the OS provides an aperture ID (for example, aperture B) associated with the portion 520, a starting address for the portion 520, and a size of the portion 520. This information is stored by the network interface 220(*b*) into the upstream translation table 502. It will thereafter be up to the network interface 220(*b*) to map that aperture ID to portion 520. A point to note is that, in remotely accessing portion 520, the other nodes will be referencing the aperture ID and not any particular physical memory address within portion 520. Using the aperture ID in this way enables each other node's physical address space to be decoupled from node B's physical address space; hence, each other node is able to maintain its own physical address space. After updating the upstream translation table 502, the network interface 220(b) of node B sends one or more packets across network 102 to advertise the availability of portion 520.

An advertisement packet is received by the network interface 220(a) of node A and passed on to the OS executing on node A. In response, the OS on node A augments the physical address space 510(a) of node A to include physical address portion 530, which in this example is the same size as portion 520. The OS knows that this portion 530 is not part of the physical address space provided by the local memory (hence, portion 530 is shown in dashed rather than solid lines). Nonetheless, the OS knows that it can access portion 530 in the same manner as it can access any portion of local memory. After augmenting the physical address space 510(a) to include portion 530, the OS informs the north bridge of node A of the augmentation. The north bridge will thereafter know portion 530 is mapped to the local memory of a remote node. The OS also causes the network interface 220(a) of node A to update its downstream translation table 504 to include the starting address of portion 530, the size of portion 530, the aperture ID (aperture B in the current example), and the network address of node B. Thereafter, the network interface 220(a) will know to map any access to an address within portion 530 to aperture B of node B.

Suppose now that the OS on node A causes an MTM of the posted request transaction type to be sent to the north bridge of node A. Suppose further that this MTM is directed to a physical address within portion 530. Upon receiving this MTM, the north bridge determines that this physical address is not within the physical address range provided by the local memory. Thus, the north bridge forwards the MTM on to the network interface 220(a). In response, the network interface 220(a), using the information stored in the downstream translation table 504, maps this physical address to aperture B of node B. Also, based upon the starting address of portion 530 and the physical address in the MTM, it computes an offset value (this offset is the value that needs to be applied to the starting address of portion 530 to derive the physical address in the MTM). Once it has done that, the network interface 220(a) composes a packet, which encapsulates at least some if not all of the information in the MTM. This packet also includes the aperture ID, the computed offset value, and the network address of node B. After that is done, the network interface 220(a) sends the packet into the network 102 destined for node B.

Upon receiving the packet, the network interface 220(b) of node B, using the information in the upstream translation table 502, maps the aperture ID to the starting address of portion 520. It then derives the actual physical address within portion 520 that is to be accessed by applying the offset value provided in the packet to the starting address of portion 520. The network interface 220(b) then uses the MTM information in the packet to compose an MTM that will be sent to the north bridge 304 of the node B. This MTM will contain all of the information that the north bridge 304 will need to perform the requested memory access on a particular physical address within portion 520. In this manner, remote memory access may be set up and implemented between two nodes on a network. In the example of FIG. 5, node B is shown as making a portion of its local memory available to node A. It should be noted that node A may likewise make a portion of its local memory available to node B. In such a case, the network interface 220(a) on node A would also have an upstream translation table similar to that shown for the network interface 220(b) of node B, and the network interface 220(b) on node B would also have a downstream translation table similar to that shown for the network interface 220(A) of node A.

In addition, the network interface 220(a) of node A would perform the operations just described for the network interface 220(b) of node B, and the network interface 220(b) of node B would perform the operations just described for the network interface 220(a) of node A.

In the above description, the OS's on both nodes A and B are already up and running; thus, they are able to control the remote memory access setup process (which includes advertising the availability of portion 520, causing the upstream translation table 502 to be populated, augmenting physical address space 510(a) to include portion 530, causing the downstream translation table 504 to be populated, etc.). It should be noted, though, that it is possible to implement remote memory access even before the OS's are up and running. This requires some pre-programming, but it is possible. To illustrate how this many be done, reference will be made to an example.

Suppose that the OS 210 of node A is not stored in the local persistent storage 308 of node A. Instead, suppose that the OS 210 is stored remotely in portion 520 of node B's physical address space 510(b). Suppose further that the downstream translation table 504 and the upstream translation table 502 are pre-populated with mapping information that enables the OS 210 to be located in portion 520.

When node A boots up, the processor 302 on node A executes a set of code in a BIOS (basic input output system) (not shown). The purpose of this code is to perform some very low level hardware setup functions, and then to execute and transfer control over to an OS. In one embodiment, this BIOS code is pre-programmed to look for the OS code 210 at a specific physical address. When the BIOS code is executed by the processor 302 of node A, the processor 302 generates an MTM to access the specific physical address at which the OS code 210 starts. This MTM (which would be a read request) is passed to north bridge 304. The north bridge 304 does not recognize this physical address; thus, it passes the MTM on to the network interface 220(a) of node A. Using the pre-populated information in the downstream translation table 504, the network interface 220(a) maps the specific physical address to node B. It then composes a network packet to encapsulate the MTM (in which the specific physical address is translated into an aperture ID and offset), and sends the packet into the network 102.

The packet is received by the network interface 220(b) of node B. Using the pre-populated information in the upstream translation table 502, the network interface 220(b) maps the aperture ID and offset to a physical address within portion 520. The network interface 220(b) then uses the MTM information in the packet to compose an MTM that is sent to the north bridge 304 of node B. In response, the north bridge 304 of node B accesses the proper physical address within portion 520, reads the contents therein, and returns the contents to network interface 220(b). The network interface 220(b) then sends the contents back to the network interface 220(a) of node A, which forwards the contents to the north bridge 304 of node A, which forwards the contents to the processor 302 of node A. In this manner, the processor 302 of node A is able to load and execute an OS 210 that is located at a remote memory. With this capability, it is possible for a node to not store an OS 210 locally.

Other Functions Performed by Network Interface

The above discussion highlights the mapping function performed by the network interfaces 220. In addition to this function, the network interfaces, in one embodiment of the present invention, also implement several other functions to enable remote memory access to be carried out across a lossy network.

Recall from previous discussion that when a processor issues an MTM to carry out a memory access, the processor has two major expectations. First, it expects the memory access requested in the MTM to be performed, i.e. the MTM cannot be dropped or ignored. Second, the processor expects the ordering rules of the processor bus protocol discussed above to be enforced. For a local memory access, these expectations are not a problem. The processor bus coupling the processor and the north bridge is a lossless bus; thus, the MTM is assured of being received and processed by the north bridge. In addition, the north bridge ensures that the ordering rules are enforced. Thus, in a local memory access, these two expectations are easily met.

The same cannot be said for a remote memory access, however. Because the MTMs (encapsulated within network packets) now have to travel across a potentially lossy network, there is no guarantee that the MTMs will get to the remote node at all. Also, because the local north bridge is no longer controlling the memory access process, there is no guarantee that the ordering rules of the processor bus protocol will be enforced. In addition, because packets may be dropped, even if packets are sent in the right order from one node, there is no guarantee that they will be received in the same order at the remote node (dropped packets and resent packets may cause the packets to arrive out of order). In light of these problems, unless additional functionalities are provided, the expectations of the processor cannot be met in a remote memory access. In one embodiment, to enable remote memory access to be implemented properly to meet all of the expectations of the processor, the network interfaces 220 of the sending and receiving nodes implement additional functionalities. These additional functionalities: (1) facilitate enforcement of the ordering rules of the process bus protocol; and (2) ensure that all packets sent to a remote node are received by the remote node, and that they are received in the proper sequence.

Figure 6:
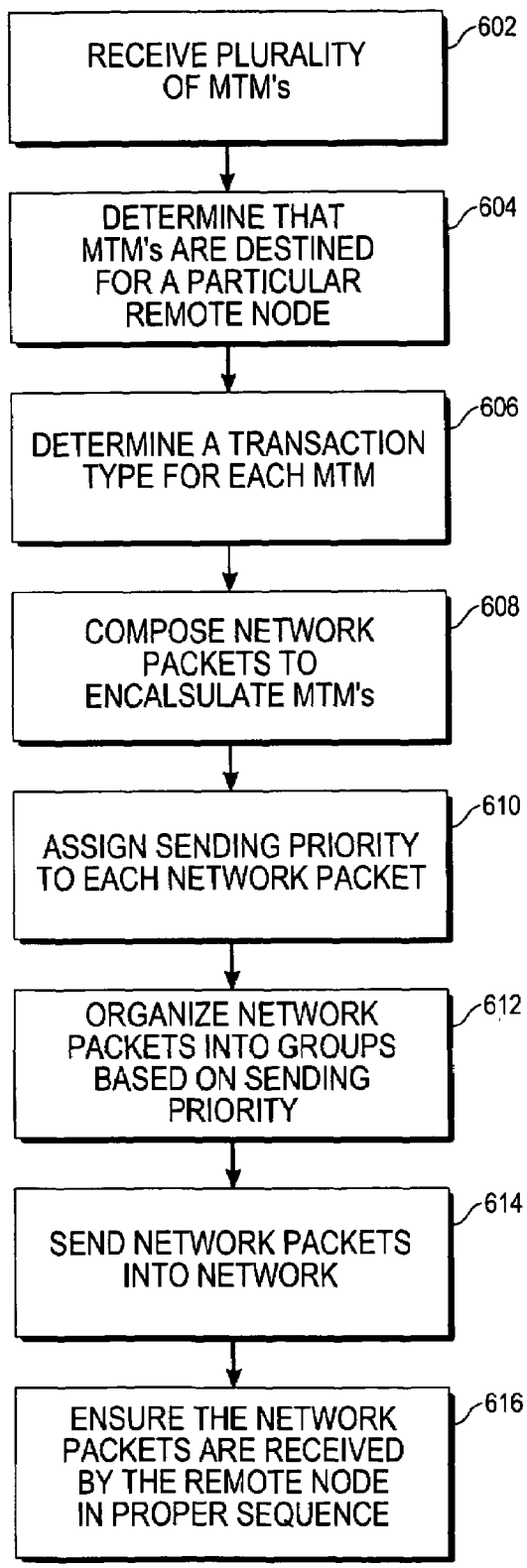
FIG. 6 shows the operation of a network interface, in accordance with one embodiment of the present invention.

With reference to FIG. 6, there is shown an overview of the operation of a network interface 220 in accordance with one embodiment of the present invention. FIG. 6 shows the operation of the network interface 220 when it is sending packets encapsulating MTMs to a remote node. In describing this operation, reference will be made to FIGS. 3, 5, and 6. The network interface whose operation is being described in FIG. 6 will be assumed to be the network interface 220(a) of node A, and the remote node will be assumed to be node B.

In operation, the network interface 220(a) of node A receives (block 602) a plurality of MTMs from the north bridge 304 of node A. Zero or more of these MTMs may be requests originated by the processor 302 to access portion 530 of node A's physical address space, which maps to portion 520 of node B's physical address space. Also, zero or more of these MTMs may be responses generated by the north bridge 304 in response to requests from node B. For example, if node B sent a read request to read data from an address of node A's local memory 306, then the north bridge 304 would read data from that address, and generate a response that contains the read data.

Based on the information in the MTMs, the network interface 220(a) determines (block 604) that all of these MTMs are destined for remote node B. This determination may be made based upon information in the MTMs, the mapping information stored in the downstream translation table 504, or both. For example, the network interface 220(a) may use the information in the downstream translation table 504 to map the physical address specified in an MTM to aperture B of node B. In addition to determining a destination node for each MTM, the network interface 220(a) also determines (block 606) a transaction type for each MTM. In one embodiment, these transaction types are the ones mentioned previously, namely, posted request, non-posted request, and response. The transaction type may be determined by examining the memory access command in each MTM.

Further, the network interface 220(a) composes (block 608), for each MTM, a network packet to encapsulate at least a portion of that MTM. In addition to information pertaining to the MTM, this network packet contains all of the information needed to transport the packet to the remote node B, which includes, for example, the network address of node B, the aperture ID for portion 520, and an offset value. As each network packet is composed, it is assigned (block 610) a sending priority, and that sending priority is inserted into the network packet. In one embodiment, the sending priority assigned to a network packet is determined based upon the transaction type of the MTM that that network packet is encapsulating. As observed previously, MTMs of the posted request type have the highest priority in the processor bus protocol ordering rules. MTMs of the response type have the next highest priority, and MTMs of the non-posted request type have the lowest priority. Thus, in one embodiment, to be consistent with the processor bus protocol ordering rules, the network interface 220(a) assigns priorities as follows. If a network packet is encapsulating an MTM that is of the posted request type, then a first priority is assigned to that network packet, where the first priority is the highest priority. If a network packet is encapsulating an MTM that is of the response type, then a second priority is assigned to that network packet, where the second priority is lower than the first priority. Finally, if a network packet is encapsulating an MTM that is of the non-posted request type, then a third priority is assigned to that network packet, where the third priority is lower than the second priority.

After the sending priorities are assigned, the network interface 220(a) organizes (block 612) the network packets into groups based upon sending priority. In one embodiment, all network packets with first priority are put into a first queue (in one embodiment, the last composed packet goes to the end of the queue). All network packets with second priority are put into a second queue, and all network packets with third priority are put into a third queue. In one embodiment, the first, second, and third queues are per remote node. That is, there are a first, second, and third queues for remote node B, a first, second, and third queues for remote node C, and so forth.

After the network packets are organized into groups, the network interface 220(a) sends (block 614) the network packets into the network 102 to be transported to remote node B. The network packets are sent in an order determined based, at least partially, upon the sending priorities. In one embodiment, all of the network packets in the first queue are sent first. Only if there are no network packets in the first queue will the network packets in the second queue be sent. Likewise, only if there are no network packets in the first and second queues will the network packets in the third queue be sent. By sending the network packets in this order, the network interface 220(a) in effect enforces the ordering rules of the processor bus protocol. In one embodiment, the sent packets are stored in a packet buffer (not shown) on the network interface 220(a). They remain stored in the packet buffer until their receipt is acknowledged by the remote node B.

Thereafter, the network interface 220(a) ensures (block 616) that all of the sent packets are received by the remote node B, and that they are received in a proper sequence. More specifically, the network interface 220(*a*) ensures that at least a particular subset of the network packets having a particular sending priority are received by remote node B in a proper sequence. In one embodiment, the network interface 220(*a*) does so by maintaining a plurality of linked-lists of sent packets organized by sending priority. These linked-lists are specific to a particular remote node. Thus, in the current example, there are three linked-lists for remote node B: one with all of the first priority packets; another with all of the second priority packets; and another with all of the third priority packets. In one embodiment, as each network packet is received by the network interface 220(*b*) of the remote node B, an acknowledgement packet is sent by the network interface 220(*b*) indicating receipt of that network packet. If the network packets are received by the remote node B in the same order as they were sent, then the acknowledgement packets should also come back to the network interface 220(*a*) on node A in that order.

Under certain circumstances however (for example, a network packet was dropped or corrupted, or an acknowledgement packet was dropped or corrupted), the network interface 220(*a*) on node A may not receive an acknowledgement packet for a network packet within a certain period of time. When that occurs, the network interface 220(*a*) resends that network packet and all network packets following that network packet in the linked-list of which the packet is a part. The network packets are resent in the same order as before. The network interface 220(*a*) then waits for acknowledgement of the resent packets. By monitoring for acknowledgement packets, and by resending network packets, when necessary, in this manner, the network interface 220(*a*) ensures that all of the network packets are received by the remote node B, and that the network packets are received in the right sequence.

Specific Operational Examples

The above discussion provides an overview of the operation of a network interface 220 in accordance with one embodiment of the present invention. With reference to specific examples, the operation of a network interface 220 will now be described in greater detail. In the following discussion, reference will again be made to FIGS. 3 and 5, and it will again be assumed that node A is the local sending node and node B is the remote target node.

Suppose that the processor 302 of node A sends an MTM to the north bridge 304 that is a read request to read from a physical address within portion 530. Upon receiving this MTM, the north bridge 304 determines that the physical address in the MTM is not within the local memory 306; thus, it forwards the MTM to the network interface 220(*a*) of node A to perform a remote memory access.

Upon receiving the forwarded MTM, the network interface 220(*a*), using the information in the downstream translation table 504, maps the physical address in the MTM to aperture B of remote node B; hence, it determines that the MTM is destined for remote node B. In addition, the network interface 220(*a*) determines (in the manner described previously) an offset value for enabling the proper physical address of portion 520 to be accessed. The network interface 220(*a*) further determines, from the fact that the MTM is a read request, that the MTM is of the non-posted request transaction type.

The network interface 220(*a*) proceeds to compose a network packet (let's label it P1) to encapsulate at least a portion, if not all, of the information in this MTM. The network interface 220(*a*) inserts into this packet all of the information needed to transport the packet to remote node B, as well as information needed by node B to properly process the packet. Thus, packet P1 may include the network address of node B, information indicating that node A sent the packet, the aperture ID for portion 520, the offset value, etc. One other set of information that is included in the packet is a sending priority. In this example, the MTM is of the non-posted request type. That being the case, the network interface 220(*a*) assigns it a third and lowest priority. Another set of information that is included in the packet is a sequence number. This sequence number is assigned per remote node per priority level. Assuming that this packet is the initial third priority packet being destined for remote node B, it is assigned a sequence number of 1 (or any other desired initial number). After packet P1 is composed, it is put onto a third priority queue associated with remote node B.

Suppose now that the processor 302 of node A sends an MTM to the north bridge 304 that is a posted write request to write some data to a physical address within portion 530. Upon receiving this MTM, the north bridge 304 again determines that the physical address in the MTM is not within the local memory 306; thus, it forwards the MTM to the network interface 220(*a*) of node A to perform a remote memory access.

Upon receiving the forwarded MTM, the network interface 220(*a*), using the information in the downstream translation table 504, maps the physical address in the MTM to aperture B of remote node B; hence, it determines that the MTM is destined for remote node B. In addition, the network interface 220(*a*) determines an offset value for enabling the proper physical address of portion 520 to be accessed. The network interface 220(*a*) further determines, from the fact that the MTM is a posted write request, that the MTM is of the posted request transaction type.

The network interface 220(*a*) proceeds to compose a network packet (let's label it P2) to encapsulate at least a portion, if not all, of the information in this MTM. The network interface 220(*a*) inserts into this packet all of the information needed to transport the packet to remote node B, as well as information needed by node B to properly process the packet. One other set of information that is included in the packet is a sending priority. In this example, the MTM is of the posted request type. Thus, the network interface 220(*a*) assigns it a first and highest priority. Another set of information that is included in the packet is a sequence number. Assuming that this packet is the initial first priority packet being destined for remote node B, it is assigned a sequence number of 1 (or any other desired initial number). After packet P2 is composed, it is put onto a first priority queue associated with remote node B.

Suppose further that the processor 302 of node A sends another MTM to the north bridge 304 that is a posted write request to write some data to a physical address within portion 530. Upon receiving this MTM, the north bridge 304 again determines that the physical address in the MTM is not within the local memory 306; thus, it forwards the MTM to the network interface 220(*a*) of node A to perform a remote memory access.

Upon receiving the forwarded MTM, the network interface 220(*a*), using the information in the downstream translation table 504, maps the physical address in the MTM to aperture B of remote node B; hence, it determines that the MTM is destined for remote node B. In addition, the network interface 220(*a*) determines an offset value for enabling the proper physical address of portion 520 to be accessed. The network interface 220(*a*) further determines, from the fact that the MTM is a posted write request, that the MTM is of the posted request transaction type.

Figure 7:
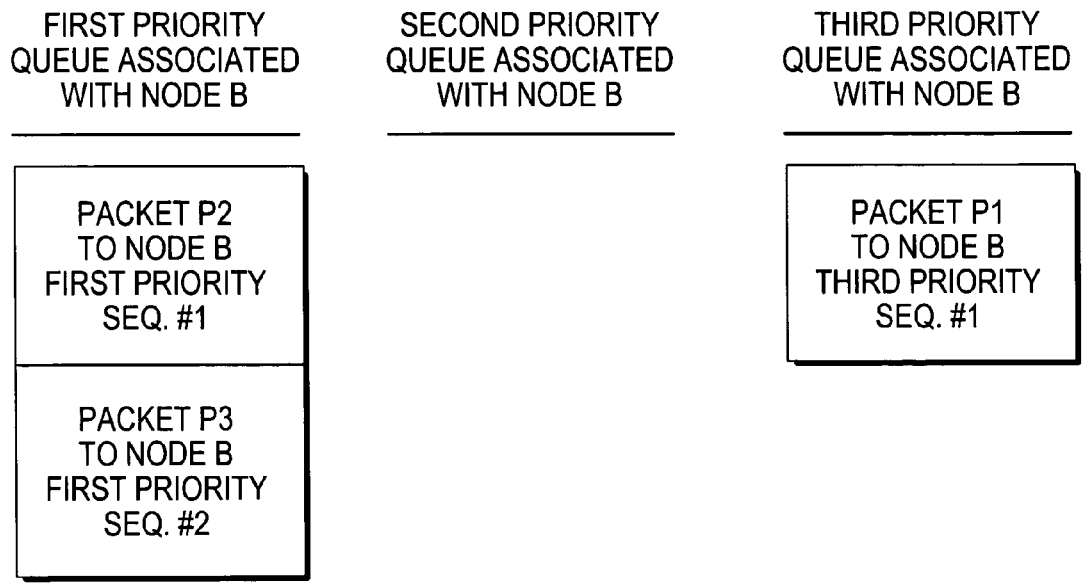
FIG. 7 shows some sample packet queues associated with a sample remote node B, in accordance with one embodiment of the present invention.

The network interface 220(*a*) proceeds to compose a network packet (let's label it P3) to encapsulate at least a portion, if not all, of the information in this MTM. The network interface 220(*a*) inserts into this packet all of the information needed to transport the packet to remote node B, as well as information needed by node B to properly process the packet. One other set of information that is included in the packet is a sending priority. In this example, the MTM is of the posted request type. Thus, the network interface 220(*a*) assigns it a first and highest priority. Another set of information that is included in the packet is a sequence number. Since this packet is also destined for remote node B, and since it follows packet P2 as the next first priority packet, it is given the next first priority sequence number, which would be, for example, 2. After packet P3 is composed, it is put onto the first priority queue associated with remote node B, right after packet P2. The current queuing situation is shown in FIG. 7. At this point, it should be noted that, in one embodiment, a separate set of queues is established for each remote node. Thus, one set of queues is established for node B, another set is established for node C (if node A is sending any remote memory access requests to node C), another set is established for node D, and so forth.

Suppose now that the network interface 220(*a*) begins sending the packets into the network 102. The network interface 220(*a*) starts with the first priority queue, and sends out packets P2 and P3, in that order (notice that even though these packets were composed by the network interface 220(*a*) after packet P1, they are sent out prior to packet P1 because of their higher priority). After all of the packets in the first priority queue are sent, the packets (if any) in the second priority queue may be sent. A second priority packet will be sent only if there are currently no packets in the first priority queue. If, before a second priority packet is sent, another first priority packet is added to the first priority queue, then that first priority packet will be sent before the second priority packet. In the current example, there are no packets in the second priority queue; thus, the network interface 220(*a*) proceeds to the third priority queue.

A third priority packet will be sent only if there are currently no packets in the first and second priority queues. If, before a third priority packet is sent, another first priority packet is added to the first priority queue and/or another second priority packet is added to the second priority queue, then that/those higher priority packet(s) will be sent before the third priority packet. In the current example, it will be assumed that no other packets are added to the other queues; thus, the network interface 220(*a*) sends packet P1 into the network 102.

Figure 8:
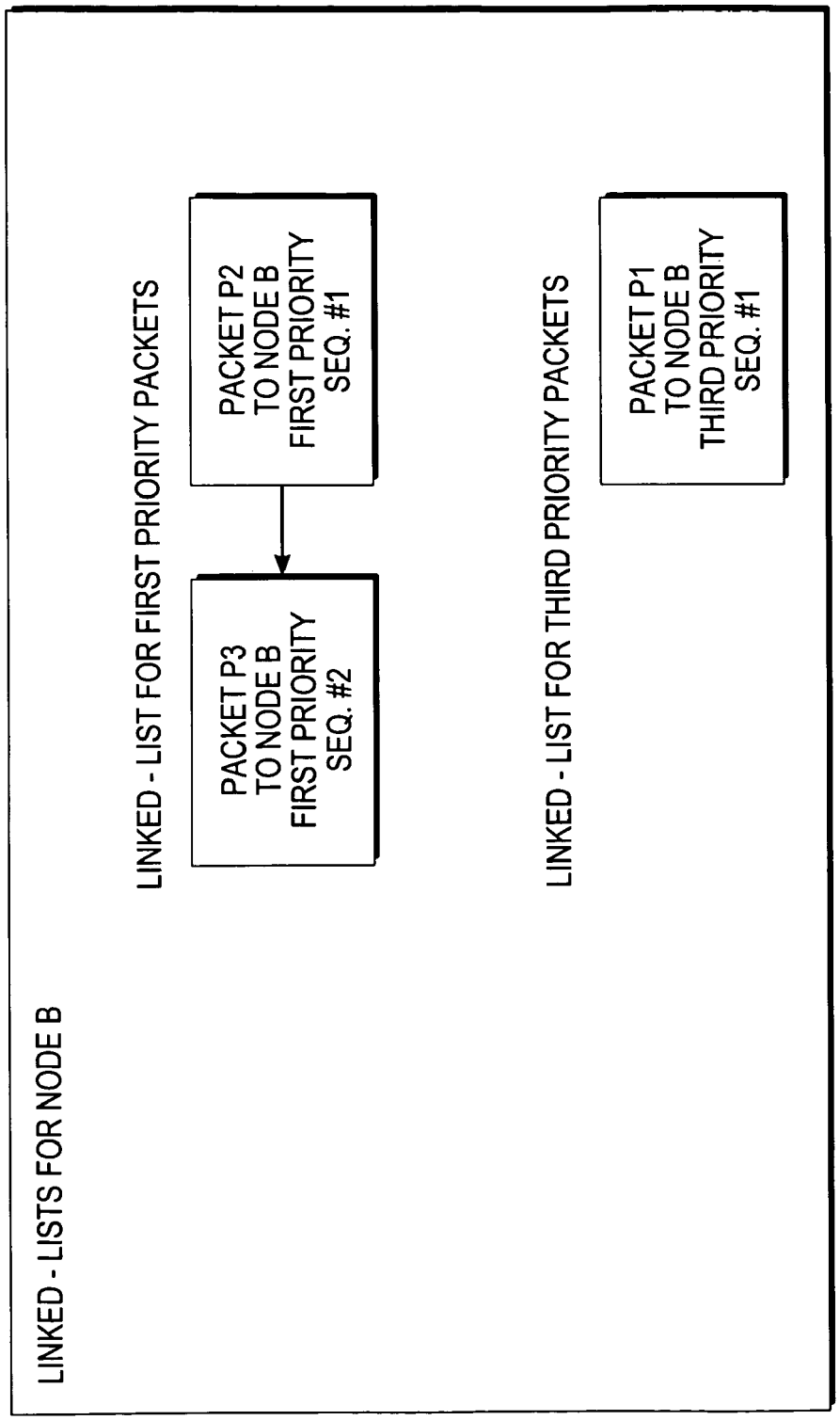
FIG. 8 shows a sample set of linked lists for sent packets, in accordance with one embodiment of the present invention.

In one embodiment, the network interface 220(*a*) stores each packet in a packet buffer (not shown) residing on the network interface 220(*a*). The packets in the packet buffer may be linked-listed to facilitate easy and convenient access. An example of the linked-lists for the current situation is shown in FIG. 8. In one embodiment, a separate set of linked-lists is maintained for each remote node, and a separate linked-list is maintained for each priority type. FIG. 8 shows the set of linked-lists maintained for the packets that have been sent to node B. As shown, there is a linked-list for first priority packets and a linked-list for third priority packets (there is no linked-list for second priority packets since, in the current example, no such packets have been sent to node B). The linked-list for first priority packets shows packet P2 as being the initial first priority packet sent. Packet P2 has a pointer to packet P3, the next first priority packet that was sent. The linked-list for third priority packets shows just packet P1, since this is the only third priority packet that has been sent. Maintaining the linked-lists in this way enables the network interface 220(*a*) to easily keep track of all of the packets that have been sent to node B.

Suppose now that after packets P2, P3, and P1 have been sent, the processor 302 of node A sends another MTM to the north bridge 304 that is a posted write request to write some data to a physical address within portion 530. Again, the north bridge 304 forwards this MTM to the network interface 220 (*a*) of node A to perform a remote memory access.

Figure 9:
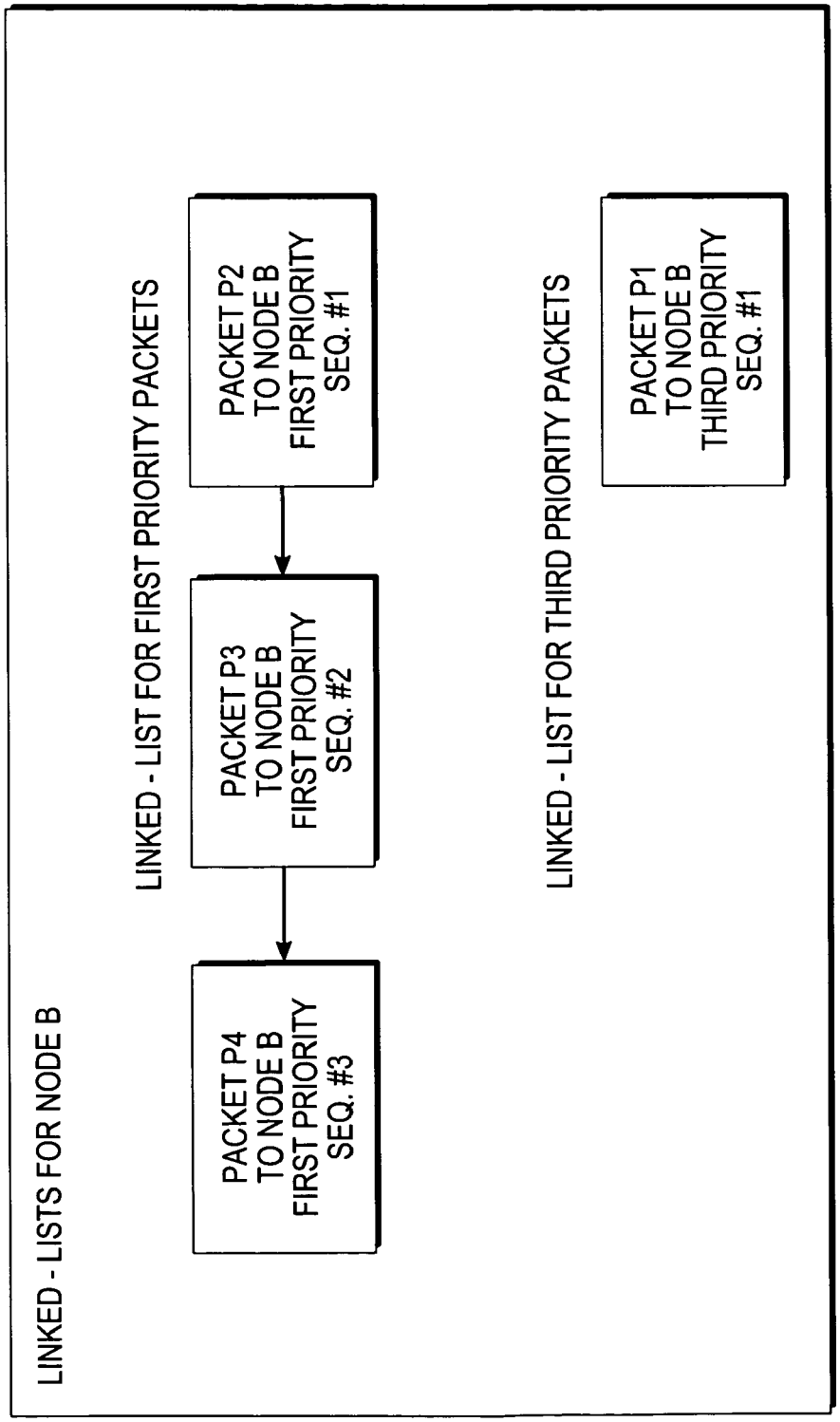
FIG. 9 shows an updated version of the linked lists of FIG. 8.

The network interface 220(*a*) processes this MTM in the same manner as that described above in connection with packets P2 and P3, and gives rise to another first priority network packet (let's label it P4). Once this packet is composed, it is put onto the first priority queue for node B, and sent into the network 102. The updated linked-lists after packet P4 has been sent to node B is shown in FIG. 9. As can be seen, packet 4 has been added to the first priority packets linked-list. It has been given a sequence number of 3 since it is the third first priority packet that has been sent to node B. Further, packet P3 has been updated to point to packet P4. After the packets are sent, the network interface 220(*a*) waits for acknowledgement from the remote node B.

Suppose that the network interface 220(*b*) on node B receives packet P2. When it does so, the network interface 220(*b*) extracts from the packet the source information (information indicating that node A sent the packet), the sending priority, and the sequence number. The network interface 220(*b*) then determines whether this sequence number matches the expected sequence number for this sending node (node A) for this sending priority (first priority). In one embodiment, the network interface 220(*b*) maintains an expected sequence number for each sending priority for each sending node. For example, it maintains an expected sequence number for node A, first priority, another expected sequence number for node A, second priority, and another expected sequence number for node A, third priority. Similarly, it maintains an expected sequence number for node C, first priority, another expected sequence number for node C, second priority, and another expected sequence number for node C, third priority. This expected sequence number represents the sequence number that the network interface 220(*b*) is expecting the next packet from a particular node having a particular sending priority to have. If the extracted sequence number is not the same as the expected sequence number, then it means that the received packet is out of sequence or out of order somehow. In such a case, the network interface 220(*b*), in one embodiment, drops the packet. Doing so prevents node B from processing out of order memory access requests. This in turn helps to enforce the ordering rules of the processor bus protocol. In one embodiment, the network interface 220(*b*) will keep dropping packets until a packet with the right sequence number is received.

In the current example, however, it will be assumed that sequence #1 is the expected sequence number for a first priority packet from node A; thus, the network interface 220 (*b*) accepts the packet, and sends an acknowledgement packet back to node A. This acknowledgement packet includes, among other information, the sequence number of packet P2 and the sending priority of packet P2. In addition to sending the acknowledgment packet, the network interface 220(*b*) also updates the expected sequence number to 2. Thus, the network interface 220(*b*) will expect the next first priority packet from node A to have the sequence number 2. Furthermore, the network interface 220(*b*) processes packet P2 to give the MTM encapsulated therein effect. Specifically, the network interface 220(*b*) extracts the MTM information from packet P2, determines the address within portion 520 that is to be accessed, composes an MTM to cause the requested posted write operation to be performed (this MTM includes the data to be written into the address), and forwards the MTM to the north bridge 304 of node B to cause the requested access to be performed. In this manner, the network interface 220(b) facilitates the remote posted write process.

On node A's side, when the network interface 220(a) receives the acknowledgement packet sent by node B, it extracts the priority information and the sequence number therefrom. Using this information, the network interface 220(a) determines that packet P2 on the first priority linked-list has been received and acknowledged by node B. Thus, it knows that it can remove packet P2 from the first priority linked-list. It also knows that the "earliest packet not yet acknowledged" on the first priority list is now packet P3. In this manner, the network interface 220(a) maintains the linked-lists.

In one embodiment, the network interface 220(a) periodically checks to see if the "earliest packet not yet acknowledged" in each linked-list has been acknowledged. If it has not been acknowledged within a certain timeout period, then the network interface 220(a) may take some action. To illustrate, suppose that packet P2 has not been acknowledged within the timeout period. This may occur for a number of reasons. For example, node B may have never received packet P2 (e.g. because P2 was dropped by the network 102), or the acknowledgement packet sent by node B may have been dropped by the network 102. Whatever the cause, when the network interface 220(a) determines that packet P2 has not been acknowledged and hence has "timed out", it resends packet P2 to node B. In addition, it resends all of the subsequent packets on the first priority linked-list to node B. These packets are resent to node B in the same order in which they were originally sent. Thus, in this example, the network interface 220(a) would resend packet P2, packet P3, and packet P4, in that order, to node B (note: in one embodiment, the network interface 220(a) does not resend packet P1 since P1 does not have the same sending priority as the packet that timed out (packet P2)). Resending all of the packets in the first priority linked-list in this way helps to ensure that the remote node B will receive all of the first priority packets, and that they will be received in the proper sequence.

The above discussion shows the example of one of the packets in the first priority linked-list timing out. Packets in one or more of the other linked-lists may also time out. For example, packet P1 on the third priority linked-list may time out. In such a case, the network interface 220(a), in one embodiment, would handle this time out in the same manner as that described above. Specifically, the network interface 220(a) would resend packet P1. In addition, it would resend all subsequent packets (if any) in the third priority linked-list. The packets would be resent in the same order in which they were originally sent. Resending packets in this manner ensures that all of the packets having the same priority are received by the remote node in the proper sequence.

To illustrate the operation of network interface 220(a) further, suppose that packets P2, P3, and P4 are sent to node B. Suppose further that the network interface 220(b) of node B receives all of the packets, and sends acknowledgements packets for all of them back to node A. Suppose, however, that the network interface 220(a) of node A does not receive the acknowledgement packet for packet P2, but does receive the acknowledgement packets for packets P3 and P4 before the timeout period for packet P2. In such a case, when the network interface 220(a) receives the acknowledgement packet for packet P3, it realizes that packet P3 is not the "earliest packet not yet acknowledged" (packet P2 is). Nonetheless, because the remote node would not have acknowledged receipt of packet P3 unless it also received packet P2, the network interface 220(a) can assume that packet P2 was also received. Thus, in this example, the network interface 220(a) would remove both packets P2 and P3 from the first priority linked-list, and make packet P4 the "earliest packet not yet acknowledged". Then, when the acknowledgment for packet P4 is received, that packet would also be removed from the linked-list. Receipt of all of the first priority packets by the remote node B in the proper order would thus be assured.

In the above discussion, node A acts as the local node that is accessing the memory of a remote node B. Thus, the network interface 220(a) of node A performs the sending and linked-list maintenance functions described above and the network interface 220(b) of node B performs the receiving and acknowledgement functions described above. It should be noted, though, that node A may also make a portion of its local memory available to node B. In such a case, node B would act as the local node that is accessing the memory of a remote node A. In such an arrangement, the network interface 220(b) of node B would perform the sending and linked-list maintenance functions described above and the network interface 220(a) of node A would perform the receiving and acknowledgement functions described above. In one embodiment, each network interface 220 is capable of performing both sets of functions. Which set of functions it performs at any particular time will depend upon the role that its associated node is playing at that time (e.g. acting as a local node or a remote node).

Network Interface Implementation

The functionalities provided by the network interface 220 have been described in detail. For purposes of the present invention, the network interface 220 and these functionalities may be realized using any desired technology. For example, the network interface 220 and its functionalites may be realized using hardware (e.g. hardware logic components, ASIC's, etc.), software (e.g. having one or more processors execute one or more sets of instructions), or a combination thereof. All such implementations are within the scope of the present invention.

At this point, it should be noted that although the invention has been described with reference to one or more specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A method, comprising:
  receiving, by a network interface of a computer system, a plurality of memory transaction messages (MTMs) from a local memory controller of the computer system, wherein each MTM of the plurality of MTMs comprises a set of information and conforms to a processor bus protocol that is used by one or more local processors of the computer system or the local memory controller to access a local memory of the computer system;
  determining, by the network interface, that the plurality of MTMs are destined for a particular remote node;
  determining, by the network interface, for each MTM of the plurality of MTMs, a transaction type;
  composing, by the network interface, for each MTM of the plurality of MTMs, a network packet to encapsulate within the network packet at least a portion of the information contained in that MTM, thereby giving rise to a plurality of network packets;

assigning to each network packet, by the network interface, one of a plurality of sending priorities based upon the transaction type of the MTM that that packet is encapsulating and based upon ordering rules associated with the processor bus protocol that defines relative priorities among MTMs exchanged between (i) one or more local processors or the local memory controller and (ii) the local memory;

organizing, by the network interface, the network packets into groups based upon sending priority;

sending, by the network interface, the network packets into a lossy network destined for the particular remote node, wherein the network packets are sent in an order determined based, at least partially, upon the sending priorities of the network packets; and ensuring, by the network interface, that a particular subset of the network packets having a particular sending priority are received by the particular remote node in a proper sequence.

2. The method of claim 1, wherein the local memory controller controls the local memory, and wherein an MTM of the plurality of MTMs comprises a request to access a remote memory which is local to and controlled by a remote node, or a response to an access request received from a remote node to access the local memory.

3. The method of claim 2, wherein each MTM of the plurality of MTMs is one of the following transaction types: (a) posted request; (b) response; and (c) non-posted request.

4. The method of claim 3, wherein assigning to each network packet one of a plurality of sending priorities comprises:

assigning a network packet a first sending priority if the MTM that that packet is encapsulating is of the posted request type;

assigning a network packet a second sending priority, which is lower than the first sending priority, if the MTM that that packet is encapsulating is of the response type; and assigning a network packet a third sending priority, which is lower than the second sending priority, if the MTM that that packet is encapsulating is of the non-posted request type.

5. The method of claim 4, wherein organizing the network packets into groups comprises:

placing all of the network packets having the first sending priority into a first queue, wherein ordering of the network packets within the first queue is determined based upon when the MTM's encapsulated by the network packets within the first queue were received by the network interface from the local memory controller;

placing all of the network packets having the second sending priority into a second queue, wherein ordering of the network packets within the second queue is determined based upon when the MTM's encapsulated by the network packets within the second queue were received by the network interface from the local memory controller; and placing all of the network packets having the third sending priority into a third queue, wherein ordering of the network packets within the third queue is determined based upon when the MTM's encapsulated by the network packets within the third queue were received by the network interface from the local memory controller.

6. The method of claim 5, wherein sending the network packets into the lossy network comprises:

sending all of the network packets in the first queue;

sending the network packets in the second queue after all of the network packets in the first queue have been sent; and sending the network packets in the third queue after all of the network packets in the first queue and the second queue have been sent.

7. The method of claim 5, wherein sending the network packets into the lossy network comprises:

determining whether there are any network packets in the first queue;

in response to a determination that there are one or more network packets in the first queue, sending the one or more network packets in the first queue into the lossy network;

in response to a determination that there are no network packets in the first queue, determining whether there are any network packets in the second queue; and in response to a determination that there is at least one network packet in the second queue, sending at least that network packet in the second queue into the lossy network.

8. The method of claim 5, wherein sending the network packets into the lossy network comprises:

determining whether there are any network packets in the first queue and the second queue;

in response to a determination that there are no network packets in the first queue and the second queue, determining whether there are any network packets in the third queue; and in response to a determination that there is at least one network packet in the third queue, sending at least that network packet in the third queue into the lossy network.

9. The method of claim 1, wherein ensuring that the particular subset of the network packets are received by the particular remote node in a proper sequence comprises:

determining whether an acknowledgement has been received from the particular remote node indicating that the remote node has received a particular network packet within the particular subset of the network packets; and in response to a determination that the acknowledgement has not been received: (a) resending the particular network packet to the particular remote node; and (b) resending, to the particular remote node, all subsequent network packets in the particular subset of the network packets that were sent to the particular remote node after the particular network packet was sent.

10. The method of claim 9, wherein the subsequent network packets are resent in the same order as they were sent previously.

11. The method of claim 1, further comprising:

receiving, by the network interface, an incoming network packet from another remote node, wherein the incoming packet is part of a certain sequence of incoming network packets from the other remote node;

extracting from the incoming network packet, by the network interface, an associated priority and a sequence number;

determining, by the network interface, whether the sequence number matches an expected sequence number for the associated priority; and in response to a determination that the sequence number does match the expected sequence number for the associated priority, sending, by the network interface, an acknowledgement packet to the other remote node.

12. The method of claim 11, further comprising:

processing, by the network interface, the incoming network packet; and updating, by the network interface, the expected sequence number for the associated priority to a new expected sequence number.

13. The method of claim 12, further comprising:
in response to a determination that the sequence number does not match the expected sequence number for the associated priority, dropping, by the network interface, the incoming network packet.

14. A network interface, comprising:
means for receiving a plurality of memory transaction messages (MTMs) from a local memory controller of a computer system, wherein each MTM of the plurality of MTMs comprises a set of information and conforms to a processor bus protocol that is used by one or more local processors of the computer system or the local memory controller to access a local memory of the computer system;
means for determining that the plurality of MTMs are destined for a particular remote node;
means for determining, for each MTM of the plurality of MTMs, a transaction type;
means for composing, for each MTM of the plurality of MTMs, a network packet to encapsulate within the network packet at least a portion of the information contained in that MTM, thereby giving rise to a plurality of network packets;
means for assigning to each network packet one of a plurality of sending priorities based upon the transaction type of the MTM that that packet is encapsulating and based upon ordering rules associated with the processor bus protocol that defines relative priorities among MTMs exchanged between (i) one or more local processors or the local memory controller and (ii) the local memory;
means for organizing the network packets into groups based upon sending priority;
means for sending the network packets into a lossy network destined for the particular remote node, wherein the network packets are sent in an order determined based, at least partially, upon the sending priorities of the network packets; and
means for ensuring that a particular subset of the network packets having a particular sending priority are received by the particular remote node in a proper sequence.

15. The network interface of claim 14, wherein the local memory controller controls the local memory, and wherein an MTM of the plurality of MTMs comprises a request to access a remote memory which is local to and controlled by a remote node, or a response to an access request received from a remote node to access the local memory.

16. The network interface of claim 15, wherein each MTM of the plurality of MTMs is one of the following transaction types: (a) posted request; (b) response; and (c) non-posted request.

17. The network interface of claim 16, wherein the means for assigning to each network packet one of a plurality of sending priorities comprises:
means for assigning a network packet a first sending priority if the MTM that that packet is encapsulating is of the posted request type;
means for assigning a network packet a second sending priority, which is lower than the first sending priority, if the MTM that that packet is encapsulating is of the response type; and
means for assigning a network packet a third sending priority, which is lower than the second sending priority, if the MTM that that packet is encapsulating is of the non-posted request type.

18. The network interface of claim 17, wherein the means for organizing the network packets into groups comprises:
means for placing all of the network packets having the first sending priority into a first queue, wherein ordering of the network packets within the first queue is determined based upon when the MTM's encapsulated by the network packets within the first queue were received by the network interface from the local memory controller;
means for placing all of the network packets having the second sending priority into a second queue, wherein ordering of the network packets within the second queue is determined based upon when the MTM's encapsulated by the network packets within the second queue were received by the network interface from the local memory controller; and
means for placing all of the network packets having the third sending priority into a third queue, wherein ordering of the network packets within the third queue is determined based upon when the MTM's encapsulated by the network packets within the third queue were received by the network interface from the local memory controller.

19. The network interface of claim 18, wherein the means for sending the network packets into the lossy network comprises:
means for sending all of the network packets in the first queue;
means for sending the network packets in the second queue after all of the network packets in the first queue have been sent; and
means for sending the network packets in the third queue after all of the network packets in the first queue and the second queue have been sent.

20. The network interface of claim 18, wherein the means for sending the network packets into the lossy network comprises:
means for determining whether there are any network packets in the first queue;
means for sending, in response to a determination that there are one or more network packets in the first queue, the one or more network packets in the first queue into the lossy network;
means for determining, in response to a determination that there are no network packets in the first queue, whether there are any network packets in the second queue; and
means for sending, in response to a determination that there is at least one network packet in the second queue, at least that network packet in the second queue into the lossy network.

21. The network interface of claim 18, wherein the means for sending the network packets into the lossy network comprises:
means for determining whether there are any network packets in the first queue and the second queue;
means for determining, in response to a determination that there are no network packets in the first queue and the second queue, whether there are any network packets in the third queue; and
means for sending, in response to a determination that there is at least one network packet in the third queue, at least that network packet in the third queue into the lossy network.

22. The network interface of claim 14, wherein the means for ensuring that the particular subset of the network packets are received by the particular remote node in a proper sequence comprises:

means for determining whether an acknowledgement has been received from the particular remote node indicating that the remote node has received a particular network packet within the particular subset of the network packets; and means for performing the following in response to a determination that the acknowledgement has not been received: (a) resending the particular network packet to the particular remote node; and (b) resending, to the particular remote node, all subsequent network packets in the particular subset of the network packets that were sent to the particular remote node after the particular network packet was sent.

23. The network interface of claim 22, wherein the subsequent network packets are resent in the same order as they were sent previously.

24. The network interface of claim 14, further comprising:

means for receiving an incoming network packet from another remote node, wherein the incoming packet is part of a certain sequence of incoming network packets from the other remote node;

means for extracting from the incoming network packet an associated priority and a sequence number;

means for determining whether the sequence number matches an expected sequence number for the associated priority; and means for sending, in response to a determination that the sequence number does match the expected sequence number for the associated priority, an acknowledgement packet to the other remote node.

25. The network interface of claim 24, further comprising:

means for processing the incoming network packet; and means for updating the expected sequence number for the associated priority to a new expected sequence number.

26. The network interface of claim 25, further comprising:

means for dropping, in response to a determination that the sequence number does not match the expected sequence number for the associated priority, the incoming network packet.

* * * * *